United States Patent
Devaraj et al.

(10) Patent No.: US 12,284,193 B2
(45) Date of Patent: Apr. 22, 2025

(54) PROACTIVE IDENTIFICATION OF POTENTIAL SECURITY THREATS ON RESIDENTIAL GATEWAY DEVICES

(71) Applicant: ARRIS Enterprises LLC, Suwanee, GA (US)

(72) Inventors: Dileep Devaraj, Bangalore (IN); Chetan Kumar Viswanath Gubbi, Bangalore (IN); Nitoo Mishra, Bangalore (IN)

(73) Assignee: ARRIS ENTERPRISES LLC, Horsham, PA (US)

(*) Notice: Subject to any disclaimer, the term of this patent is extended or adjusted under 35 U.S.C. 154(b) by 142 days.

(21) Appl. No.: 17/459,298

(22) Filed: Aug. 27, 2021

(65) Prior Publication Data

US 2022/0191221 A1    Jun. 16, 2022

Related U.S. Application Data (60) Provisional application No. 63/125,644, filed on Dec. 15, 2020.

(51) Int. Cl.
*H04L 9/40* (2022.01)
(52) U.S. Cl.
CPC ................. *H04L 63/1416* (2013.01)
(58) Field of Classification Search
CPC .................................................. H04L 63/1416
See application file for complete search history.

(56) References Cited

U.S. PATENT DOCUMENTS

| | | | |
|---|---|---|---|
| 10,778,699 B1* | 9/2020 | Bradley | H04L 63/1441 |
| 10,880,270 B1* | 12/2020 | Rigor | H04L 63/0263 |
| 10,893,058 B1* | 1/2021 | Casaburi | G06F 21/566 |
| 11,019,076 B1* | 5/2021 | Jakobsson | H04L 51/42 |
| 11,528,292 B1* | 12/2022 | Thanos | H04L 63/145 |
| 11,886,582 B1* | 1/2024 | Abdallah | G06N 3/045 |
| 2018/0152471 A1* | 5/2018 | Jakobsson | H04L 63/1425 |
| 2018/0191773 A1* | 7/2018 | O'Connell | H04L 63/1458 |
| 2019/0052672 A1* | 2/2019 | Kumar | G06F 21/316 |
| 2019/0068616 A1* | 2/2019 | Woods | H04L 63/145 |
| 2019/0095618 A1* | 3/2019 | Lim | G06F 21/55 |
| 2019/0199745 A1* | 6/2019 | Jakobsson | H04L 63/1483 |
| 2019/0347413 A1* | 11/2019 | Dubrovsky | G06F 21/54 |
| 2019/0394216 A1* | 12/2019 | Kondamuri | H04L 63/1416 |
| 2020/0076831 A1* | 3/2020 | Baughman | H04L 63/20 |
| 2020/0110873 A1* | 4/2020 | Rosendahl | G06F 21/53 |
| 2020/0344251 A1* | 10/2020 | Jeyakumar | H04L 51/212 |

(Continued)

*Primary Examiner* — Philip J Chea
*Assistant Examiner* — Ghizlane Maazouz
(74) *Attorney, Agent, or Firm* — Wenderoth, Lind & Ponack, L.L.P.

(57) ABSTRACT

A system and a method are provided for an external server for use with a first network device and an external network. The external server contains: a memory having a priori data stored therein, the a priori data includes a plurality of potential security attack signatures; and a processor configured to execute instructions stored on the memory to cause the external server to: monitor the first network device for actions on the first network device; identify an action on the first network device that matches one of the plurality of potential security attack signatures of the a priori data; and notify the first network device that the action is a potential security attack.

9 Claims, 7 Drawing Sheets

(56) References Cited

U.S. PATENT DOCUMENTS

| | | | |
|---|---|---|---|
| 2020/0389486 A1* | 12/2020 | Jeyakumar | H04L 63/20 |
| 2021/0194924 A1* | 6/2021 | Heinemeyer | G06N 5/04 |
| 2021/0243226 A1* | 8/2021 | El Gamal | H04L 63/1491 |
| 2021/0250368 A1* | 8/2021 | Hearty | H04L 63/1416 |
| 2022/0114490 A1* | 4/2022 | Das | G06N 20/00 |

* cited by examiner

PROACTIVE IDENTIFICATION OF POTENTIAL SECURITY THREATS ON RESIDENTIAL GATEWAY DEVICES

BACKGROUND

Embodiments of the present disclosure relate to identification of security threats on residential gateway devices.

SUMMARY

Aspects of the present disclosure are drawn to an external server for use with a first network device and an external network. The external server contains a memory having a priori data stored therein, the a priori data includes a plurality of potential security attack signatures; and a processor configured to execute instructions stored on the memory to cause the external server to: monitor the first network device for actions on the first network device; identify an action on the first network device that matches one of the plurality of potential security attack signatures of the a priori data; and notify the first network device that the action is a potential security attack.

In some embodiments, the processor is configured to execute instructions stored on the memory to additionally cause the external server to update the a priori data based on the action on the first network device that matches the one of the plurality of potential security attack signatures of the a priori data.

In some embodiments, the second network device and first network device are the same network device.

In some embodiments of the external server, one of the plurality of potential security attack signatures is based on an action on a second network device and is associated with a degradation of service provided by the second network device.

Other aspects of the present disclosure are drawn to a method of using an external server with a first network device and an external network. The method includes: storing, into a memory, a priori data including a plurality of potential security attack signatures; monitoring, via a processor configured to execute instructions stored on the memory, the first network device for actions on the first network device; identifying, via the processor, an action on the first network device that matches one of the plurality of potential security attack signatures of the a priori data; and notifying, via the processor, the first network device that the action is a potential security attack.

In some embodiments, the method further includes updating, via the processor, the a priori data based on the action on the first network device that matches the one of the plurality of potential security attack signatures of the a priori data.

In some embodiments of the method, the second network device and the first network device are the same network device.

In some embodiments of the method, one of the plurality of potential security attack signatures is based on an action on a second network device and is associated with a degradation of service provided by the second network device.

Other aspects of the present disclosure are drawn to a non-transitory, computer-readable media having computer-readable instructions stored thereon, the computer-readable instructions being capable of being read by an external server with a first network device and an external network, wherein the computer-readable instructions are capable of instructing the external server to perform the method including: storing, into a memory, a priori data including a plurality of potential security attack signatures; monitoring, via a processor configured to execute instructions stored on the memory, the first network device for actions on the first network device; identifying, via the processor, an action on the first network device that matches one of the plurality of potential security attack signatures of the a priori data; and notifying, via the processor, the first network device that the action is a potential security attack.

In some embodiments, the computer-readable instructions are capable of instructing the external server to perform the method further including updating, via the processor, the a priori data based on the action on the first network device that matches the one of the plurality of potential security attack signatures of the a priori data.

In some embodiments, the computer-readable instructions are capable of instructing the external server to perform the method wherein the second network device and the first network device are the same network device.

In some embodiments, the computer-readable instructions are capable of instructing the external server to perform the method wherein one of the plurality of potential security attack signatures is based on an action on a second network device and is associated with a degradation of service provided by the second network device.

BRIEF SUMMARY OF THE DRAWINGS

The accompanying drawings, which are incorporated in and form a part of the specification, illustrate example embodiments and, together with the description, serve to explain the principles of the disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Auto configuration servers (ACS) are used within communication networks to remotely manage customer premises equipment (CPE) such as gateway devices. Protocols, such as Technical Report 069 (TR-069), a technical specification of the Broadband Forum, or Simple Network Management Protocol (SNMP), a component of the Internet Protocol Suite as defined by the Internet Engineering Task Force (IETF), are used to define exactly how and what type of data is exchanged between an ACS and CPE, such as a gateway device, for the purposes of CPE management, monitoring, and service provisioning.

The gateway device is a critical connection between a home network and the outside world, i.e., the Internet, connecting client devices and their users to the software and applications they need to work and manage their daily lives. But within a home network, the gateway device is often the single entry and exit point used by the home network to reach outside networks, causing the gateway device to be a target for security attacks. Cyber threat actors can gain access to a home network and the users on that network by searching for vulnerabilities on a gateway device and exploiting them.

Security measures are often provisioned on a network after a security breach event has happened. Many times, after a computer network or system has been exploited, a method is created to prevent future security breaches of the same type. However, when a security method is implemented after a network has already been breached, much damage has already been done, and the individuals or organizations affected are often victims of identity theft, lost revenue, and intellectual property loss. This will now be described in greater detail with reference to FIG. 1.

Figure 1:
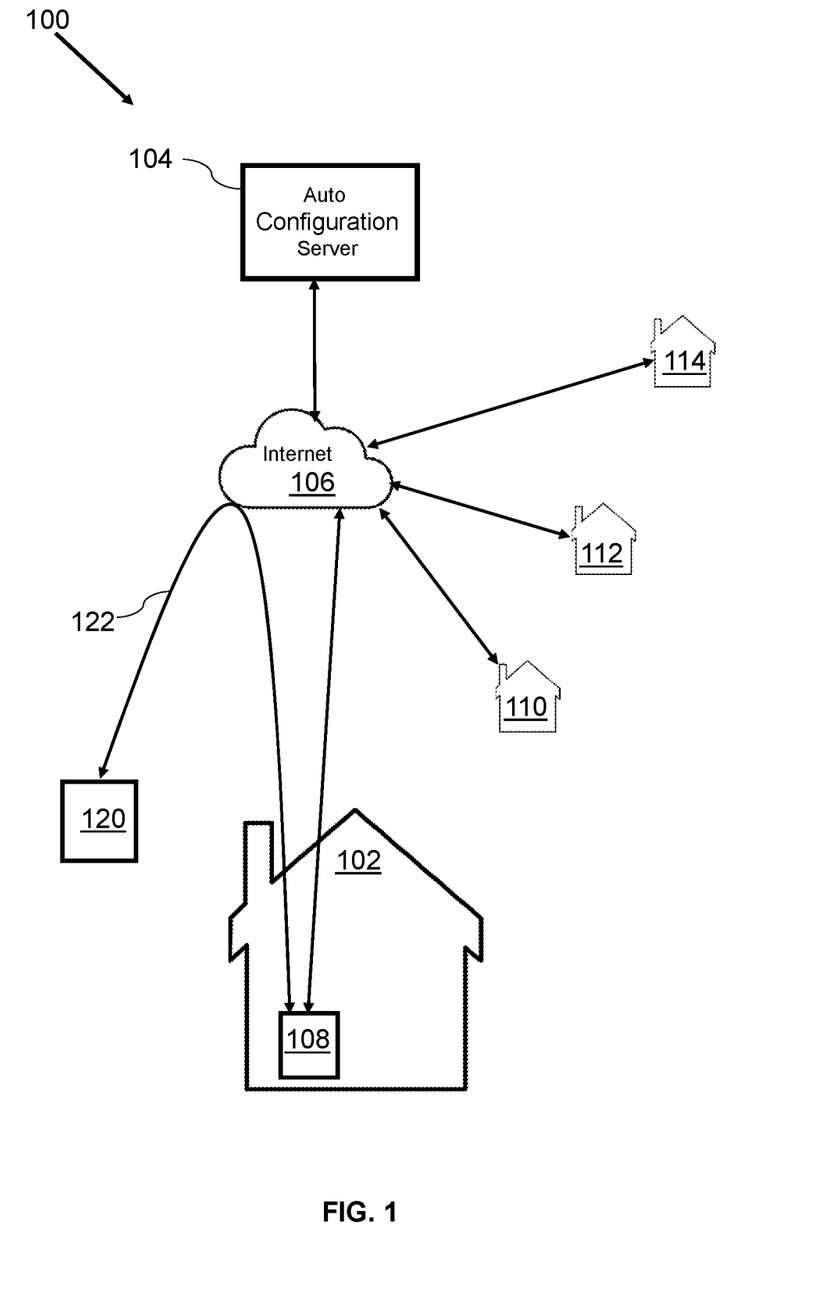
FIG. 1 illustrates structural components implementing an electronic communication network at a time $t_1$.

FIG. 1 illustrates structural components implementing an electronic communication network 100 at a time $t_1$, which includes: a gateway device 108; a plurality of residences illustrated as a residence 102, 110, 112, and 114; an Internet 106, an auto configuration server (ACS) 104; a client device 120; and a communication signal 122. Residence 102 contains gateway device 108.

Gateway device 108, also referred to as a gateway device, residential gateway device, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 108 may be any device or system that is operable to allow data to flow from one discrete network to another. Gateway device 108 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Further, it should be noted that gateway device 108 is able to communicate with Internet 106 via physical media/wiring, which may optionally be a wireless communication system, such as 4G, or 5G, and further is able to connect to auto configuration server 104 via Internet 106.

Gateway device 108 serves as a gateway device or access point to Internet 106 for one or more electronic devices (not shown), referred to generally herein as client devices, that wirelessly communicate with gateway device 108 via, e.g., Wi-Fi. These client devices can be desk top computers, laptop computers, electronic tablet devices, smart phones, appliances, or any other so called Internet of things equipped devices that are equipped to communicate information via Wi-Fi.

As shown in FIG. 1, at time $t_1$, the user of client device 120 is a cyber threat actor that has found a security vulnerability within gateway device 108 and has successfully broken into gateway device 108 as illustrated by communication signal 122. This break-in leaves the users of gateway device 108 vulnerable to identity theft, lost revenue, and intellectual property loss.

What is needed is a system and a method for identifying and reacting to security threats to a residential gateway device before security attacks occur.

A system and a method in accordance with the present disclosure solves the problem of proactively identifying security threats to a residential gateway device.

In accordance with the present disclosure, an auto configuration server, using both supervised and unsupervised machine learning processes, is trained to monitor data parameters received from an associated gateway device to look for expected and unexpected security threats. A supervised machine learning process within the auto configuration server is first trained with a priori data that include at risk parameters that are indicators of attempted security attacks and benign parameters that are indicators of benign communications. The a priori data could be of various forms, non-limiting examples of which include: thresholds for the number of failed login attempts during a specific time interval, maximum number of CPU processes during a specific time interval, percent of CPU utilization during a specific time interval, number of packet drops on malformed or unsolicited packets during a specific time interval, number of unsolicited DNS requests during a specific time interval, and the number of TCP/UDP sessions during a specific time interval. Within the supervised machine learning process, the a priori data is labeled, meaning that the data parameters are identified as being either signatures of a potential (or actual security attack) or signatures of a benign communication.

Then, as future actual or attempted security attacks take place and new data is received from the gateway device in conjunction with those attacks, an unsupervised machine learning process learns from that data so that it can proactively identify expected and unexpected threats to the security of the gateway device. In particular, the unsupervised machine learning process takes the a priori data as well as additional labeled data received from the gateway device that is an indicator of an attack and uses this new data to generate additional signatures that are indicators of security attacks or to modify previous signatures of security attacks.

Similarly, as future benign communications take place and new data is received from the gateway device in conjunction with benign communications, the unsupervised machine learning process learns from that data so that it can proactively distinguish benign communications from attacks. The unsupervised machine learning process takes the a priori data as well as additional labeled data received from the gateway device that is an indicator of a benign communication and uses this data to generate additional signatures that are indicators of benign communications.

In addition, the unsupervised machine learning process looks at data parameters received from the gateway device that previously were not identified as signatures of a security attack but that could be potential signatures of a security attack. Within the machine learning algorithm described in the present disclosure, this data is also called unlabeled data because it has not yet been identified as a signature of a security attack. The unlabeled data could be of various forms, depending on what type of data is collected by the gateway device.

For purposes of discussion, assume that the gateway device is connected to and collects data from multiple Internet of Things (IoT) devices. Depending of the type of devices it is connected to, the data collected by the gateway device could include: telemetry data, which is data captured by sensors within IoT devices such as measurements of temperature, proximity, pressure, water quality, the presence of certain chemicals and gas, smoke, infrared radiation, fluid levels, images, motion detection, acceleration, angular velocity, humidity, and electromagnetic energy. The unlabeled data collected by the gateway device from the Internet of Things devices could also include device state data, which is data indicating the current state of the device. Is the device on or off? The unlabeled data could also include device operational data such as data parameters indicating the operational temperature of the CPU, the condition of the battery, the number of processes running in the CPU, and the number of bytes of data being sent or received by the device to the gateway device during a specific interval.

If the unsupervised machine learning process is able to come up with patterns from the unlabeled data that definitively identify new signatures of potential security attacks, it then labels or tags those data patterns as signatures of a security attack and then sends those labeled data patterns both to the supervised machine learning process for refinement and inclusion with the a priori data as well as to the security threat identification algorithm.

As the a priori data increases in scope and in size, the auto configuration server is able to identify security threats against the gateway device and send remediation instructions to the gateway device to prevent security attacks against the gateway device before they occur.

The present disclosure improves the security of a gateway device because by using machine learning to learn from both a priori data as well as additional labeled data as it is received, the auto configuration server is better able to identify security threats to the gateway device before they become security breaches.

An example system and method for proactively identifying security threats within a gateway device in a communication network in accordance with aspects of the present disclosure will now be described in greater detail with reference to FIGS. 2-5B.

Figure 2:
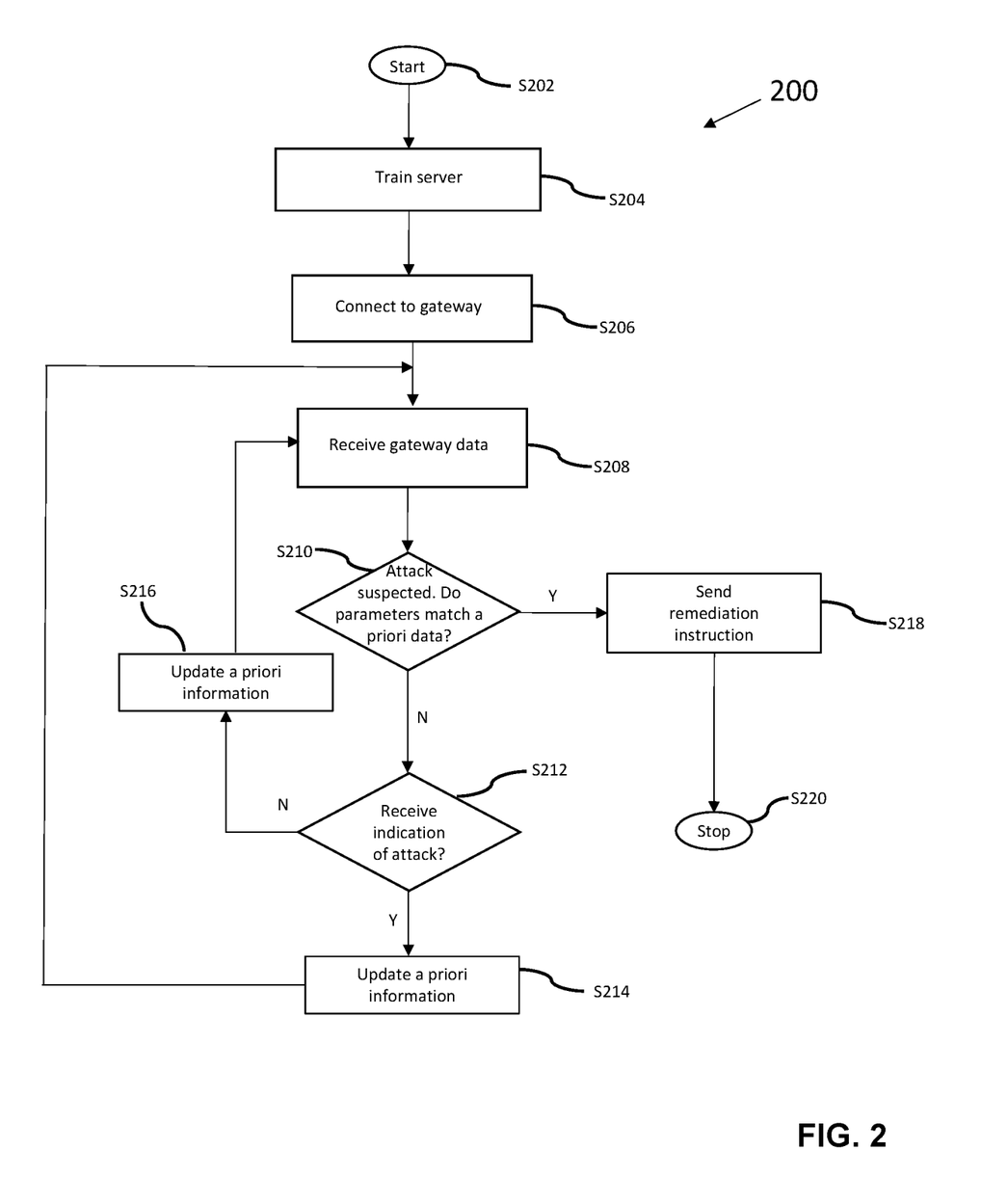
FIG. 2 illustrates an example algorithm in which an external server is trained with a priori data, and then after a security attack is suspected, the server either updates the a priori information based on data received after the attack or sends a remediation instruction to the gateway device after the attack.

FIG. 2 illustrates an example algorithm 200 in which an auto configuration server is trained with a priori data, and then after a security attack is suspected, the auto configuration server either updates the a priori information based on data received after the attack or sends a remediation instruction to the gateway device after the attack.

An example embodiment will now be described with reference to FIGS. 3A-5B.

Figure 3A:
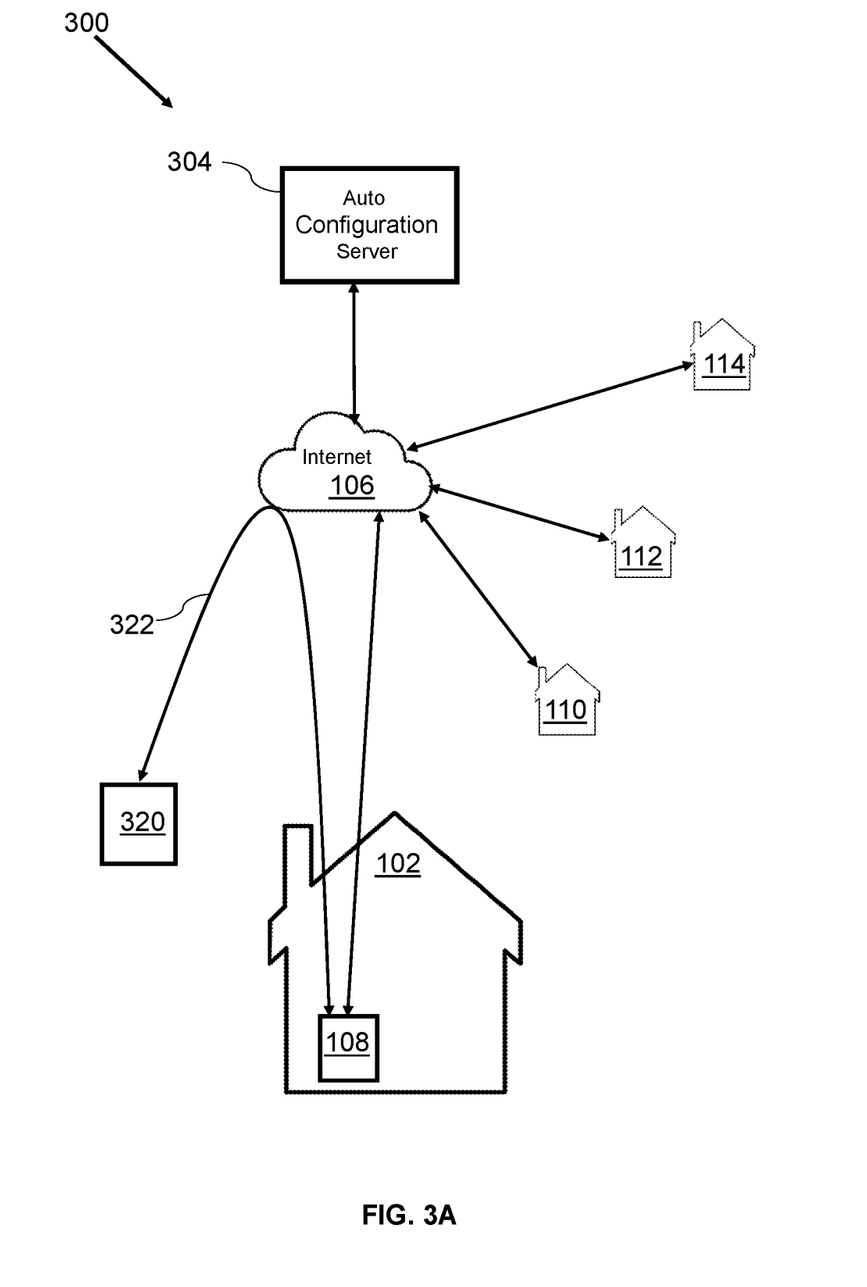
FIG. 3A illustrates structural components implementing an electronic communication network at a time $t_2$ in accordance with aspects of the present disclosure.

FIG. 3A illustrates structural components implementing an electronic communication network 300 at time $t_2$ in accordance with aspects of the present disclosure.

As shown in the picture, network 300 includes: a gateway device 108; a plurality of residences illustrated as residence 102, 110, 112, and 114; Internet 106, auto configuration server (ACS) 304; a client device 320; and a communication signal 322.

As shown in FIG. 3A, at time $t_2$, the user of client device 320 is a cyber threat actor that has found a security vulnerability within gateway device 108 and has successfully broken into gateway device 108 as illustrated by communication signal 322. This break-in leaves the users of gateway device 108 vulnerable to identity theft, lost revenue, and intellectual property loss. However, this time, ACS 304 has within its memory a machine learning program that is able to learn from the break-in and prepare gateway device 108 to stop this type and similar types of security attacks.

Figure 3B:
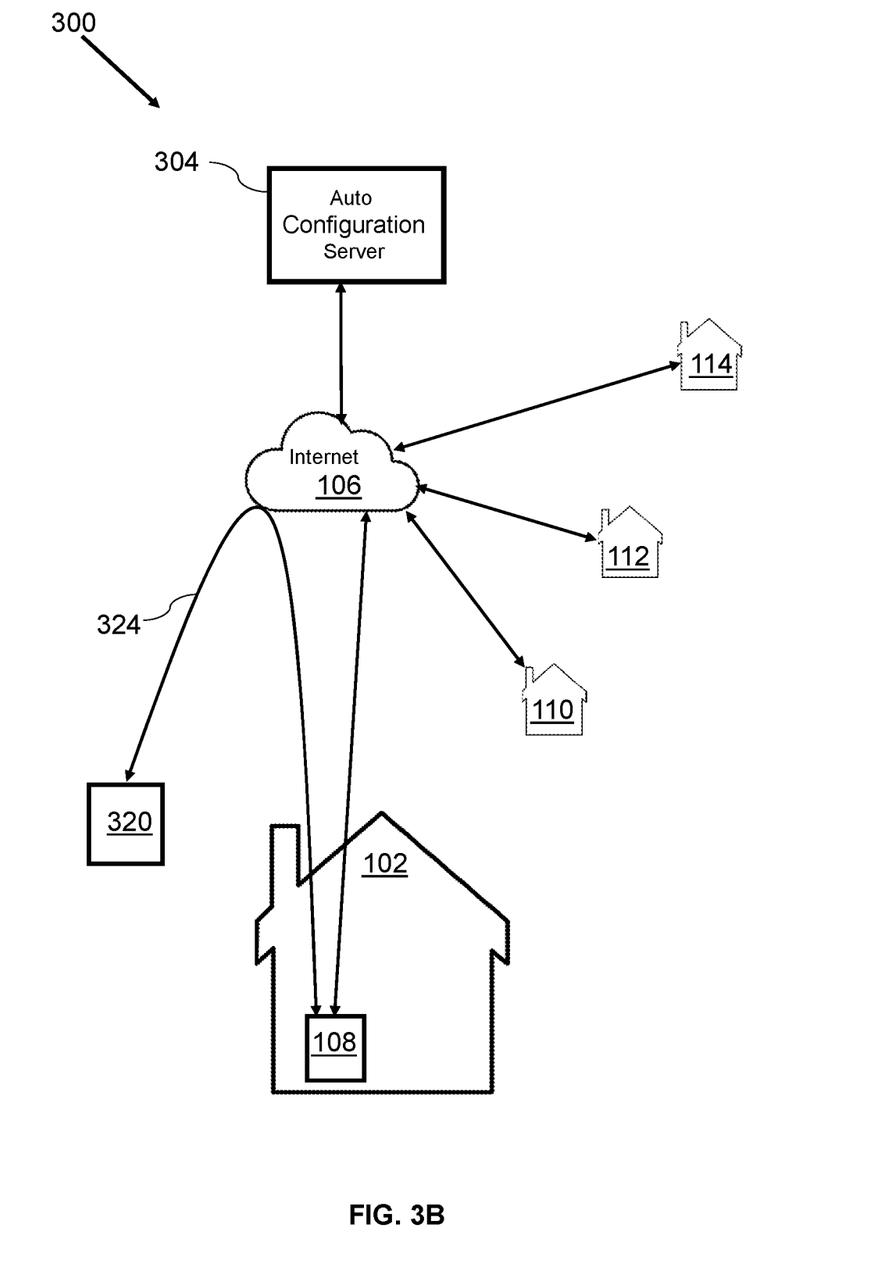
FIG. 3B further illustrates the electronic communication network of FIG. 3A at a time $t_3$.

FIG. 3B further illustrates the electronic communication network of FIG. 3A at a time $t_3$ in accordance with aspects of the present disclosure. As shown in the picture, network 300 includes: gateway device 108; a plurality of residences illustrated as residence 102, 110, 112, and 114; Internet 106, auto configuration server (ACS) 304; a client device 340; and a communication signal 324.

As shown in FIG. 3B, at time $t_3$, the user of client device 340 is a cyber threat actor that has tried to break into gateway device 108, as illustrated by communication signal 324. This time, the cyber threat actor is unsuccessful because the machine learning program in ACS 304 has learned to recognize the data signatures associated with this type of attack and has provided details to gateway device 108 to stop this security attack. This time, the users of gateway device 108 are protected from identity theft, lost revenue, and intellectual property loss.

This will now be described in further detail with reference to FIGS. 4-5B.

Figure 4:
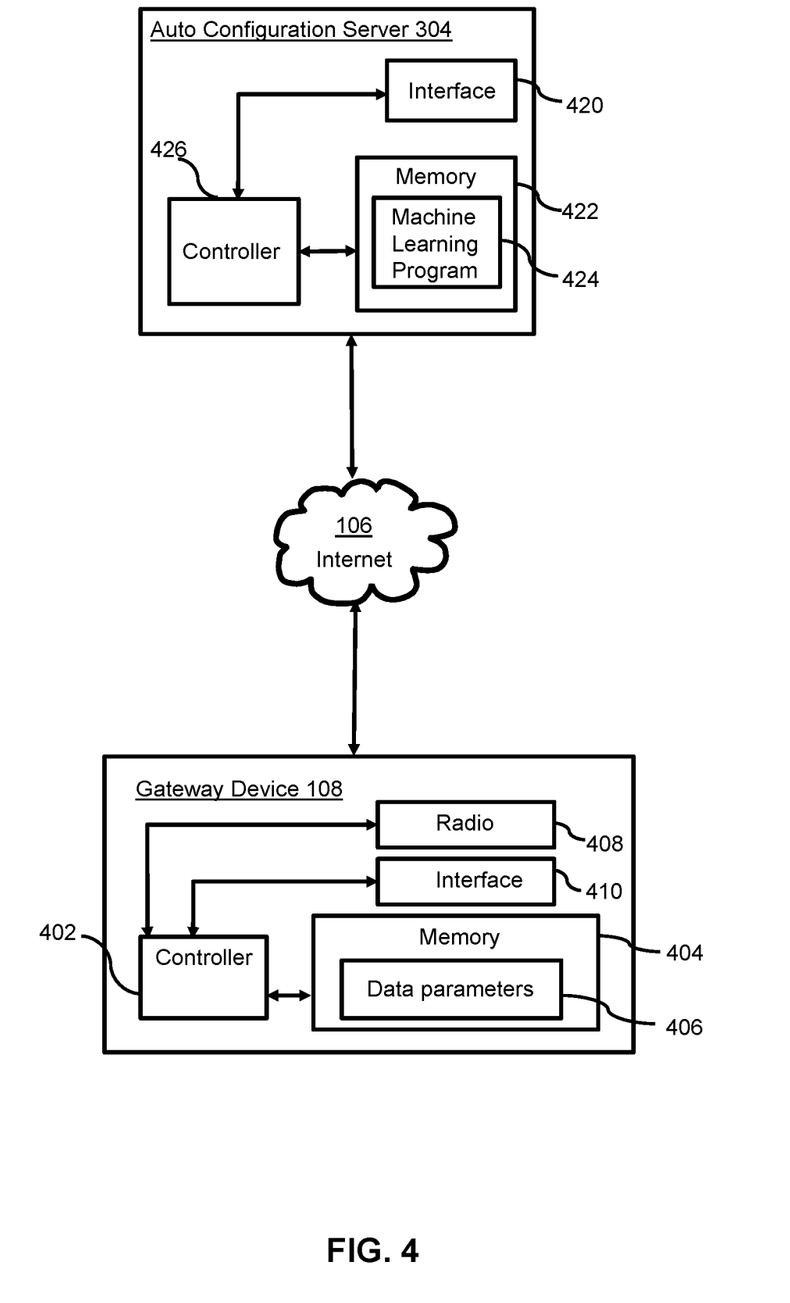
FIG. 4 illustrates an exploded view of an external server and a gateway device in accordance with aspects of the present disclosure.

FIG. 4 illustrates an exploded view of ACS 304 and gateway device 108 of FIGS. 3A-B.

As shown in FIG. 4, gateway device 108 includes: a controller 402; a memory 404, which has stored therein data parameters 406; at least one radio, a sample of which is illustrated as a radio 408; and an interface circuit 410.

In this example, controller 402, memory 404, radio 408, and interface circuit 410 are illustrated as individual devices. However, in some embodiments, at least two of controller 402, memory 404, radio 408, and interface circuit 410 may be combined as a unitary device. Whether as individual devices or as combined devices, controller 402, memory 404, radio 408, and interface circuit 410 may be implemented as any combination of an apparatus, a system and an integrated circuit. Further, in some embodiments, at least one of controller 402, memory 404 and interface circuit 410 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 402 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 108 in accordance with the embodiments described in the present disclosure. Memory 404 can store various programming, and user content, and data. Interface circuit 410 can include one or more connectors, such as RF connectors, or Ethernet connectors, and/or wireless communication circuitry, such as 5G circuitry and one or more antennas. Interface circuit 410 receives content from Internet 106 by known methods, non-limiting examples of which include terrestrial antenna, satellite dish, wired cable, DSL, optical fibers, or 5G as discussed above. Through interface circuit 410, gateway device 108 receives an input signal, including data and/or audio/video content, from Internet 106 and can send data to Internet 106.

Radio 408, (and preferably two or more radios), may also be referred to as a wireless communication circuit, such as a Wi-Fi WLAN interface radio transceiver and is operable to communicate with one or more client devices. Radio 408 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Gateway device 108 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

Insofar as gateway device 108 provides connection to Internet 106 and through Internet 106 to a service provider, such as an MSO, gateway device 108 can be equipped with connectors to connect with a television or display device, and can also include programming to execute an electronic program guide and/or other suitable graphical user interface (GUI), and can with such configuration be referred to as a so called set top box. Such a set top box can be included in the system shown in FIGS. 3A-B as gateway device 108 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so called smart media device.

Auto configuration server 304 includes: a controller 426; a memory 422, which has stored therein a machine learning program 424; and an interface circuit 420.

In this example, controller 426 and memory 422 are illustrated as individual devices. However, in some embodiments, at least two of controller 426 and memory 422 may be combined as a unitary device. Further, in some embodiments, at least one of controller 426 and memory 422 may be implemented as a computer having tangible computer-readable media for carrying or having computer-executable instructions or data structures stored thereon.

Controller 426 may be implemented as hardware circuitry such as a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of auto configuration server 304 in accordance with the embodiments described in the present disclosure.

Memory 422 can store various programming, and user content, and data.

As will be described in more detail below, controller 426 is configured to execute instructions stored on memory 422 to cause ACS 304 to: monitor gateway device 108 for actions on gateway device 108; identify an action on gateway device 108 that matches one of the plurality of potential security attack signatures of the a priori data; and notify gateway device 108 that the action is a potential security attack.

As will be described in more detail below, controller 426 is configured to execute instructions stored on memory 422 to additionally cause ACS 304 to update the a priori data based on the action on gateway device 108 that matches the one of the plurality of potential security attack signatures of the a priori data.

Figure 5A:
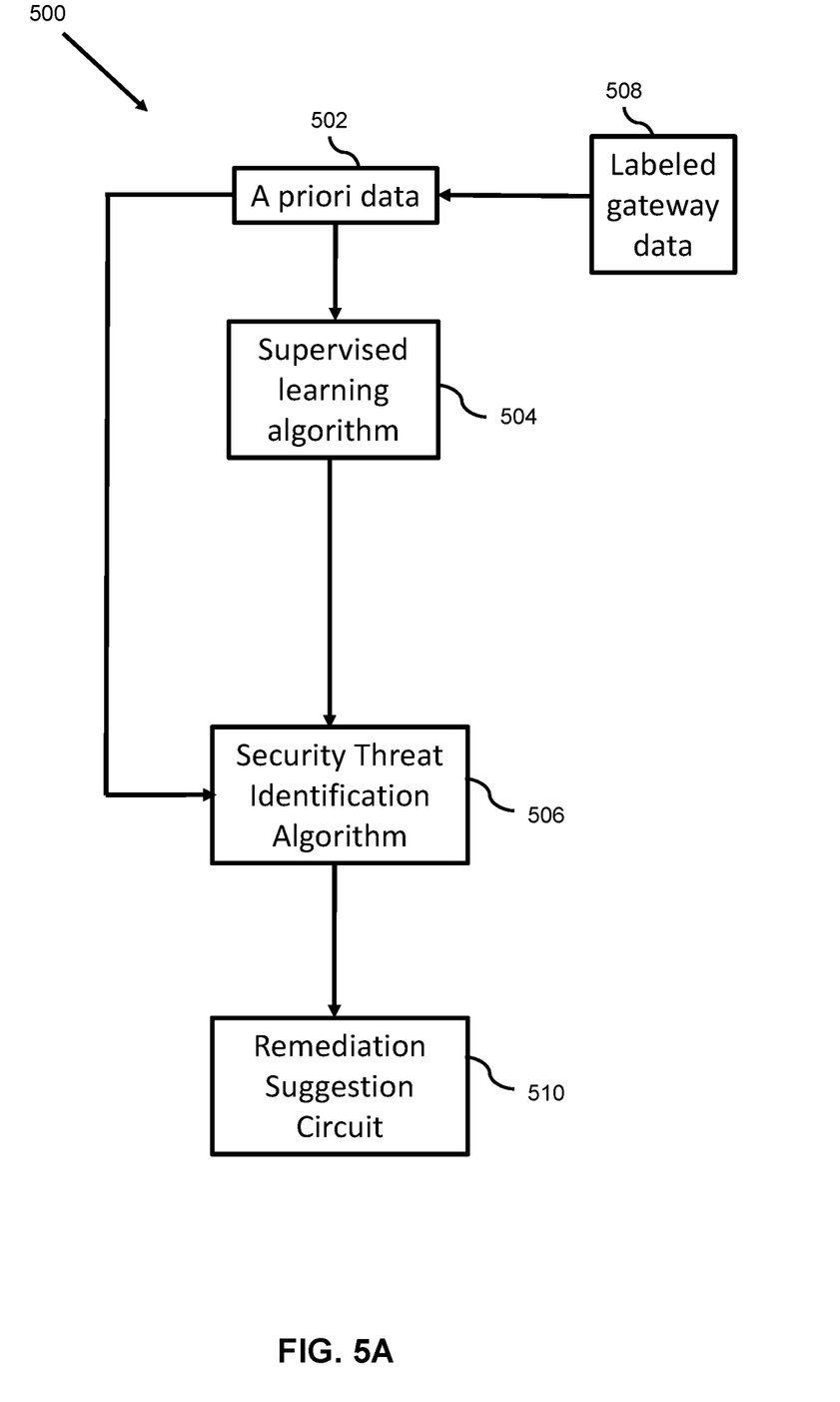
FIG. 5A illustrates an example supervised machine learning process in accordance with aspects of the present disclosure.

FIG. 5A illustrates an example supervised machine learning process 500 in accordance with aspects of the present disclosure. As shown in FIG. 5A, a priori data 502 is sent to a supervised machine learning algorithm 504 within machine learning program 424 as well as to a security threat identification algorithm 506 within machine learning program 424. Labeled gateway device data 508, which is additional data received from both gateway device 108 and an unsupervised machine learning process (as will be discussed below), is also provided for additional learning. As shown in FIG. 5A, results from security threat identification algorithm 506 are sent to a remediation instruction circuit 510, which in some embodiments may reside or be a part of controller 426.

Figure 5B:
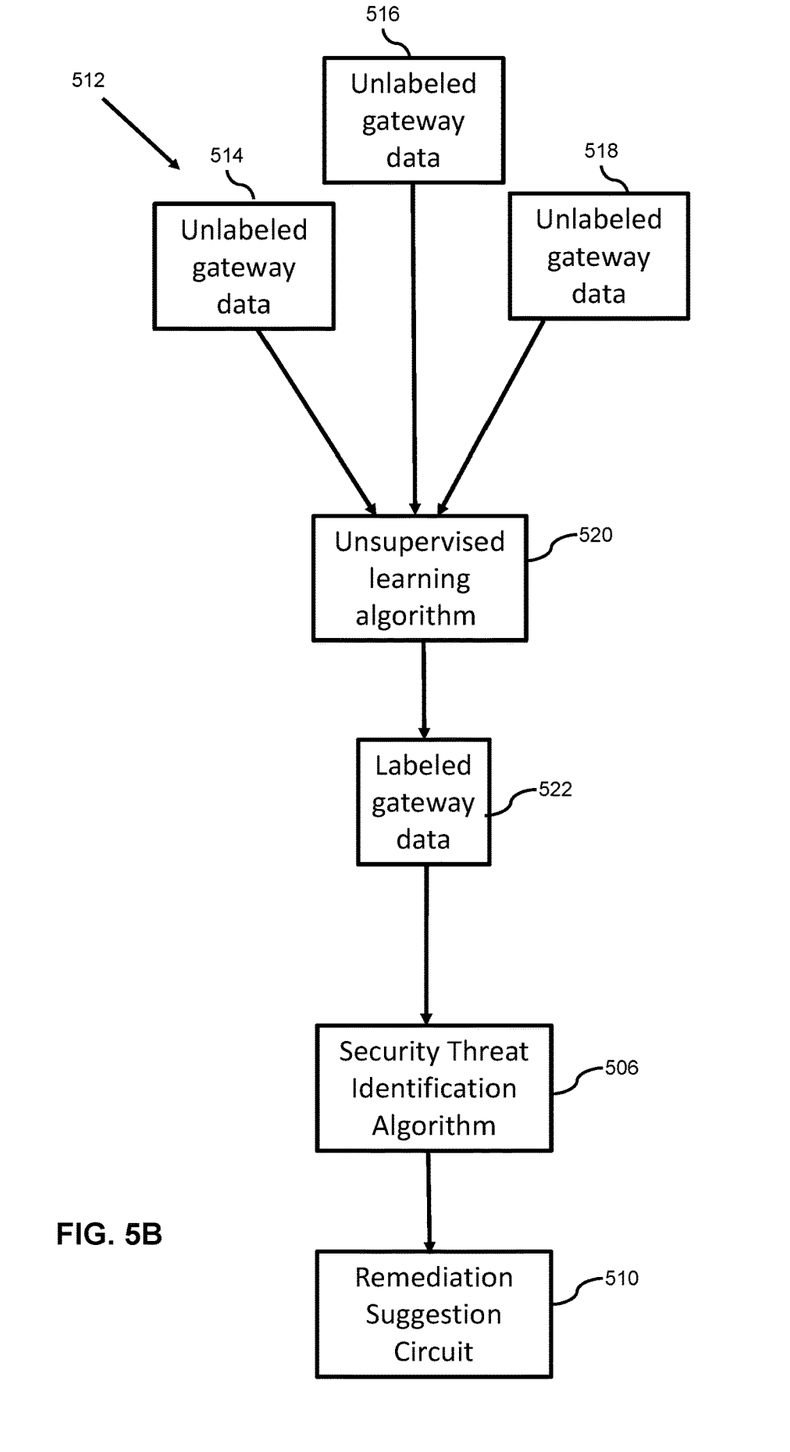
FIG. 5B illustrates an example unsupervised machine learning process in accordance with aspects of the present disclosure.

FIG. 5B illustrates an example unsupervised machine learning process 512 in accordance with aspects of the present disclosure. As shown in FIG. 5B, unlabeled gateway device data, an example of which are illustrated as unlabeled gateway device data 514, 516, and 518, or data parameters that have not been previously identified with or associated with security attacks, are processed by an unsupervised machine learning process 520 for pattern identification. Unsupervised machine learning process 520 may be performed by controller 426. It should be noted that unlabeled gateway device data may be collected from a plurality of different gateway devices being monitored by auto configuration server 304.

When controller 426 performs unsupervised machine learning process 512 and thereby discovers new data patterns that are also signatures of security attacks, this data is labeled as labeled gateway data 522 and sent for processing through security threat identification algorithm 506 so that it can be used to identify security threats. This labeled gateway data 522 may additionally be also be processed by supervised machine learning process 500 for additional learning. As shown in FIG. 5B, results from performance of security threat identification algorithm 506 are sent to remediation instruction circuit 510.

Returning to FIG. 2, algorithm 200 to be executed by a processor starts (S202), and the auto configuration server is trained (S204). For example, returning to FIG. 4, machine learning program 424 within auto configuration server 304 is trained with a priori data. For example, returning to FIG. 5A, a priori data is sent to supervised machine learning algorithm 504 within machine learning program 424 of FIG. 4 to train supervised machine learning algorithm 504.

Returning to FIG. 2, after the auto configuration server is trained (S204), the auto configuration server connects to the gateway device (S206). For example, returning to FIG. 4, after machine learning program 424 within auto configuration server 304 is trained with a priori data, auto configuration server 304 connects to gateway device 108 through Internet 106.

Returning to FIG. 2, after the auto configuration server connects to the gateway device (S206), the auto configuration server receives data from the gateway device (S208). For example, returning to FIG. 4, after auto configuration server 304 connects to gateway device 108 through Internet 106, auto configuration server 304 receives data from gateway device 108.

Returning to FIG. 2, after the auto configuration server receives data from the gateway device (S208), the auto configuration server determines if there has been an attack by comparing the data received from the gateway device to the a priori data (S210). For example, returning to FIG. 4, after auto configuration server 304 receives data parameters 406 from gateway device 108, auto configuration server 304 determines if there has been an attack on gateway device 108 by comparing data parameters 406 received from gateway device 108 to the a priori data.

In an example embodiment, not all of data parameters 406 will match corresponding parameter values in the a priori data in the case of an actual attack. Accordingly, auto configuration server 304 may determine that an attack is suspected if the number of data parameters 406 match a threshold number, n, of corresponding a priori data values, m, wherein n≤m. For example, consider the situation wherein auto configuration server 304 monitors 200 parameters of a gateway, and compares the corresponding 200 monitored values with respective 200 a priori data values. In this example, m would be 200. Now, let auto configuration server 304 determine that there is an attack on the gateway if at least 125 of the monitored 200 parameters of the gateway match corresponding a priori data values. In this example, n would be 125. In this manner, auto configuration server 304 determines a likelihood of an attack based on whether the number of data parameters 406 match a threshold number, n, of corresponding a priori data values, m.

Returning to FIG. 2, if the auto configuration server determines that there has been an attack by comparing the data received from the gateway device to the a priori data (Y at S210), the auto configuration server sends a remediation instruction (S218). For example, returning to FIG. 4, if auto configuration server 304 determines that there has been an attack on gateway device 108 by comparing data parameters 406 received from gateway device 108 to the a priori data, auto configuration server 304 sends a remediation instruction to gateway device 108.

A remediation instruction may be based on the type of attack. For example, memory 422 may include a data structure that associates types of attacks with one or more respective remediation instructions. For example a denial of service attack may have an associated remediation instruction to close all open TCP/UDP ports. In some embodiments, the remediation instruction causes controller 402 of gateway device 108 to perform actions to prevent or mitigate a suspected attack. Non-limiting examples of such actions to be performed by controller 402 of gateway device 108 include closing an open TCP/UDP port for a predetermine period of time, disconnecting from the Internet for a predetermined period of time, and rebooting.

Returning to FIG. 2, after the auto configuration server sends a remediation instruction (S218), algorithm 200 stops (S220). For example, returning to FIG. 4, after auto configuration sever 304 sends a remediation instruction to gateway device 108, the algorithm stops.

Returning to FIG. 2, if the a priori data does not match the data received from the gateway device (N at 210), the auto configuration server checks if it has received an indication of an attack (S212). Returning to FIG. 4, if the number of data parameters 406 received by auto configuration server 304 from gateway device 108 that match the a priori data is not greater than the threshold number, n, of corresponding a priori data values, m, wherein n≤m, auto configuration server 304 checks to see if gateway device 108 has been attacked.

In other words, returning to FIG. 3B, when auto configuration server 304 collects the data parameters from gateway device 108, if a sufficient number of the collected data parameters do not match the a priori data that indicates a likelihood of an attack, auto configuration server 304 takes a wait-and-see approach. If the performance of gateway device 108 suddenly changes for example as a result in a dramatic increase in network bandwidth or a dramatic increase in outbound traffic, then auto configuration server 304 determines that gateway device 108 has been attacked. On the other hand, if the performance of gateway device 108 does not suddenly change, auto configuration server 304 determines that gateway device 108 has not been attacked.

Returning to FIG. 2, if the auto configuration server has received an indication of an attack (Y at S212), the auto configuration server updates the a priori information (S214). For example, returning to FIG. 4, if auto configuration server 304 determines that gateway device 108 has been attacked, auto configuration server 304 updates the a priori information. For example, returning to FIG. 5A, data parameters which were not previously identified as signatures of a security attack are labeled as at risk data parameters, which are signatures of a security attack and are added to the a priori data.

Returning to FIG. 2, after the auto configuration server updates the a priori information (S214), the auto configuration server continues to receive more data from the gateway device (S208). For example, returning to FIG. 4, after auto configuration server 304 updates the a priori information, auto configuration server 304 continues to receive new data parameters 406 from gateway device 108.

Returning to FIG. 2, if the auto configuration server has not received an indication of an attack (N at S212), the auto configuration server updates the a priori information (S216). For example, returning to FIG. 4, if auto configuration server 304 determines that gateway device 108 has not been attacked, auto configuration server 304 updates the a priori information. For example, returning to FIG. 5A, data parameters which were not previously identified as signatures of a communication that is not a security attack are labeled as benign data parameters, which are signatures of a benign communication and are added to the a priori data.

Returning to FIG. 2, after the auto configuration server updates the a priori information (S216), the auto configuration server receives more data from the gateway device (S208). For example, returning to FIG. 4, if auto configuration server 304 has not received an indication of an attack, auto configuration server 304 will continue to receive new data parameters 406 from gateway device 108.

Accordingly, the collected at risk data parameters (collected from S214) and the collected benign data parameters (collected from S216) are constantly added to the a priori data to update the learning system to enable auto configuration server 304 to more accurately differentiate an attack from a benign communication.

Auto configuration servers are used within communication networks to remotely manage customer premises equipment (CPE) such as gateway devices. The gateway device is a critical connection between a home network and the outside world. But because the gateway device is often the single entry and exit point to an external network for the users of a home network, it is extremely vulnerable to security attacks. Security measures are often provisioned on a network after an event has happened. However, when a security method is implemented after a network has already been attacked, much damage may have already been done to the users of that network.

A system and method in accordance with the present disclosure solves the problem of proactively identifying and reacting to security threats to a gateway device before they occur by using supervised and unsupervised machine learning algorithms on a connected auto configuration server. The machine learning algorithms are trained on a priori data as well as actual data received from the gateway device as a result of security attack events. The present disclosure improves the security of a gateway device because by using machine learning algorithms to learn from both a priori data and data parameters received as a result of security attack events, the auto configuration server is better able to identify security threats to the gateway device before they become actual security attacks.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. An external server for use with a first network device and an external network, said external server comprising:
   a memory having a priori data stored therein, the a priori data includes a plurality of security attack signatures, each of which includes a respective plurality of data values; and
   a processor configured to execute instructions stored on said memory to cause said external server to:
      train a supervised machine learning algorithm of a machine learning program stored in the memory based on the a priori data that includes one or more at risk parameters that are indicators of attempted security attacks and one or more benign parameters that are indicators of benign communications;
      receive, from the first network device, first data that is an indicator of a benign communication, the indicator not having been previously identified or associated with security attacks;
      generate one or more signatures based on the first data indicative of the benign communication;
      store the one or more signatures as part of the a priori data stored on the memory;
      receive from the first network device unlabeled data that has not been previously identified as one of the plurality of security attack signatures;
      process by an unsupervised machine learning process, performed by the processor, the unlabeled data for pattern identification;
      monitor the first network device for actions on the first network device by collecting a number of data parameters of the unlabeled data from the first network device;
      identify an action of the actions on the first network device when a number m of the number of data parameters matches at least the number m of the plurality of data values of one of the plurality of security attack signatures of the a priori data; and
      notify the first network device that the action is a security attack, wherein m is greater than or equal to a predetermined threshold number n;
      send a remediation instruction to the first network device based on a type of the security attack to cause the first network device to perform one or more prevention or mitigation actions;
      label the unlabeled data based on the pattern identification and additional data received from the unsupervised machine learning process for storage as part of the a priori data stored on the memory so as to train the supervised machine learning algorithm, wherein the additional data is one or more new data patterns that are also one or more signatures of one or more security attacks discovered by performing the unsupervised machine learning process; and
      send the labeled data to the supervised machine learning process for additional learning.

2. The external server of claim 1, wherein said processor is configured to execute instructions stored on said memory to additionally cause said external server to update the a priori data based on the action on the first network device that matches the one of the plurality of security attack signatures of the a priori data.

3. The external server of claim 1, wherein one of the plurality of security attack signatures is based on an action on a second network device and is associated with a degradation of service provided by the second network device.

4. A method of using an external server with a first network device and an external network, said method comprising:
   storing, into a memory, a priori data including a plurality of security attack signatures, each of which includes a respective plurality of data values;
   training a supervised machine learning algorithm of a machine learning program stored in the memory based on the a priori data that includes one or more at risk parameters that are indicators of attempted security attacks and one or more benign parameters that are indicators of benign communications;
   receiving, from the first network device, first data that is an indicator of a benign communication, the indicator not having been previously identified or associated with security attacks;
   generating one or more signatures based on the first data indicative of the benign communication;
   storing the one or more signatures as part of the a priori data stored on the memory;
   receiving from the first network device unlabeled data that has not been previously identified as one of the plurality of security attack signatures;
   processing by an unsupervised machine learning process, performed by the processor, the unlabeled data for pattern identification;
   monitoring, via a processor configured to execute instructions stored on the memory, the first network device for actions on the first network device by collecting a number of data parameters of the unlabeled data from the first network device;
   identifying, via the processor, an action of the actions on the first network device when a number m of the number of data parameters matches at least the number m of the plurality of data values of one of the plurality of security attack signatures of the a priori data; and
   notifying, via the processor, the first network device that the action is a security attack, wherein m is greater than or equal to a predetermined threshold number n; and
   sending a remediation instruction to the first network device based on a type of the security attack to cause the first network device to perform one or more prevention or mitigation actions;
   labeling the unlabeled data based on the pattern identification and additional data received from the unsupervised machine learning process for storage as part of the a priori data stored on the memory so as to train the supervised machine learning algorithm, wherein the additional data is one or more new data patterns that are also one or more signatures of one or more security attacks discovered by performing the unsupervised machine learning process; and
   sending the labeled data to the supervised machine learning process for additional learning.

5. The method of claim 4, further comprising updating, via the processor, the a priori data based on the action on the first network device that matches the one of the plurality of security attack signatures of the a priori data.

6. The method of claim 4, wherein one of the plurality of security attack signatures is based on an action on a second network device and is associated with a degradation of service provided by the second network device.

7. A non-transitory, computer-readable media having computer-readable instructions stored thereon, the computer-readable instructions being capable of being read by an external server with a first network device and an external network, wherein the computer-readable instructions are capable of instructing the external server to perform the method comprising:

storing, into a memory, a priori data including a plurality of security attack signatures, each of which includes a respective plurality of data values;

training a supervised machine learning algorithm of a machine learning program stored in the memory based on the a priori data that includes one or more at risk parameters that are indicators of attempted security attacks and one or more benign parameters that are indicators of benign communications;

receiving, from the first network device, first data that is an indicator of a benign communication, the indicator not having been previously identified or associated with security attacks;

generating one or more signatures based on the first data indicative of the benign communication;

storing the one or more signatures as part of the a priori data stored on the memory;

receiving from the first network device unlabeled data that has not been previously identified as one of the plurality of security attack signatures;

processing by an unsupervised machine learning process, performed by the processor, the unlabeled data for pattern identification;

monitoring, via a processor configured to execute instructions stored on the memory, the first network device for actions on the first network device by collecting a number of data parameters of the unlabeled data from the first network device;

identifying, via the processor, an action of the actions on the first network device when a number m of the number of data parameters matches at least the number m of the plurality of data values of one of the plurality of security attack signatures of the a priori data;

notifying, via the processor, the first network device that the action is a security attack, wherein m is greater than or equal to a predetermined threshold number n;

sending a remediation instruction to the first network device based on a type of the security attack to cause the first network device to perform one or more prevention or mitigation actions;

labeling the unlabeled data based on the pattern identification and additional data received from the unsupervised machine learning process for storage as part of the a priori data stored on the memory so as to train the supervised machine learning algorithm, wherein the additional data is one or more new data patterns that are also one or more signatures of one or more security attacks discovered by performing the unsupervised machine learning process; and sending the labeled data to the supervised machine learning process for additional learning.

8. The non-transitory, computer-readable media of claim 7, wherein the computer-readable instructions are capable of instructing the external server to perform the method further comprising updating, via the processor, the a priori data based on the action on the first network device that matches the one of the plurality of security attack signatures of the a priori data.

9. The non-transitory, computer-readable media of claim 7, wherein the computer-readable instructions are capable of instructing the external server to perform the method wherein one of the plurality of security attack signatures is based on an action on a second network device and is associated with a degradation of service provided by the second network device.

* * * * *